(12) United States Patent
Horng

(10) Patent No.: US 6,997,695 B2
(45) Date of Patent: Feb. 14, 2006

(54) ICE CREAM SCOOP

(76) Inventor: Ruey-Lan Horng, No. 420, Lane 942, Da-Wan Road, Yung-Kang City, Tainan Hsien (TW)

( * ) Notice: Subject to any disclaimer, the term of this patent is extended or adjusted under 35 U.S.C. 154(b) by 165 days.

(21) Appl. No.: 10/627,704

(22) Filed: Jul. 28, 2003

(65) Prior Publication Data

US 2005/0025851 A1 Feb. 3, 2005

(51) Int. Cl.
*A23G 9/28* (2006.01)

(52) U.S. Cl. .......... 425/283; 425/286; 425/221
(58) Field of Classification Search ......... 425/276–286, 425/221; D7/681; 30/324
See application file for complete search history.

(56) References Cited

U.S. PATENT DOCUMENTS 2,232,393 A * 2/1941 Knaust ................. 425/278
3,283,730 A * 11/1966 Mohler ................. 425/276
6,457,238 B1 * 10/2002 Maier et al. ........... 30/142

\* cited by examiner

*Primary Examiner*—Donald Heckenberg
(74) *Attorney, Agent, or Firm*—Rosenberg, Klein & Lee

(57) ABSTRACT

An ice cream scoop includes a first scoop member and a second scoop member. The first scoop member includes a handle having an end on which a ring is formed. The second scoop member includes a handle having an end on which a bowl is formed. Second ends of the handles are pivotally connected. The ring is engageable with the bowl to form a scoop for scooping ice cream. An elastic element is attached between the second end of the handle of the first scoop member and the second end of the handle of the second scoop member for biasing the ring and the bowl away from each other for ejecting ice cream.

2 Claims, 3 Drawing Sheets

ICE CREAM SCOOP

BACKGROUND OF THE INVENTION

1. Field of the Invention

The present invention relates to a scoop. More particularly, the present invention relates to an ice cream scoop.

2. Description of the Related Art

A conventional ice cream scoop includes two handles pivotally connected by a pin, and a spring is attached between the handles for biasing the handles away from each other. Each handle includes a quarter spherical bowl formed on an end thereof. The quarter spherical bowls together form a hemispherical bowl for scooping ice cream in a container. When the handles are pressed toward each other, the quarter spherical bowls move away from each other and thus reject the ice cream from the quarter spherical bowls. However, it was found that the ice cream could be successfully rejected when the scoop lay in a horizontal direction, as the ice cream is sticky in a way.

SUMMARY OF THE INVENTION

An object of the present invention is to provide an ice cream scoop for reliably rejecting ice cream.

An ice cream scoop in accordance with the present invention includes a first scoop member and a second scoop member. The first scoop member includes a handle having a first end and a second end. A ring is formed on the first end of the handle of the first scoop member. The second scoop member includes a handle having a first end and a second end. A bowl is formed on the first end of the handle of the second scoop member. The second end of the handle of the first scoop member and the second end of the handle of the second scoop member are pivotally connected.

The ring of the first scoop member is engageable with the bowl of the second scoop member to form a scoop for scooping ice cream. An elastic element is attached between the second end of the handle of the first scoop member and the second end of the handle of the second scoop member for biasing the ring of the first scoop member and the bowl of the second scoop member away from each other for ejecting ice cream.

The ring of the first scoop member is at least partially removably received in the bowl of the second scoop member.

In an embodiment of the invention, the ring includes a stepped portion in an inner periphery thereof. The ring of the first scoop member rests on top of the bowl of the second scoop member when in a state for scooping, with an outer periphery of the stepped portion of the ring being in contact with an outer periphery of the bowl.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
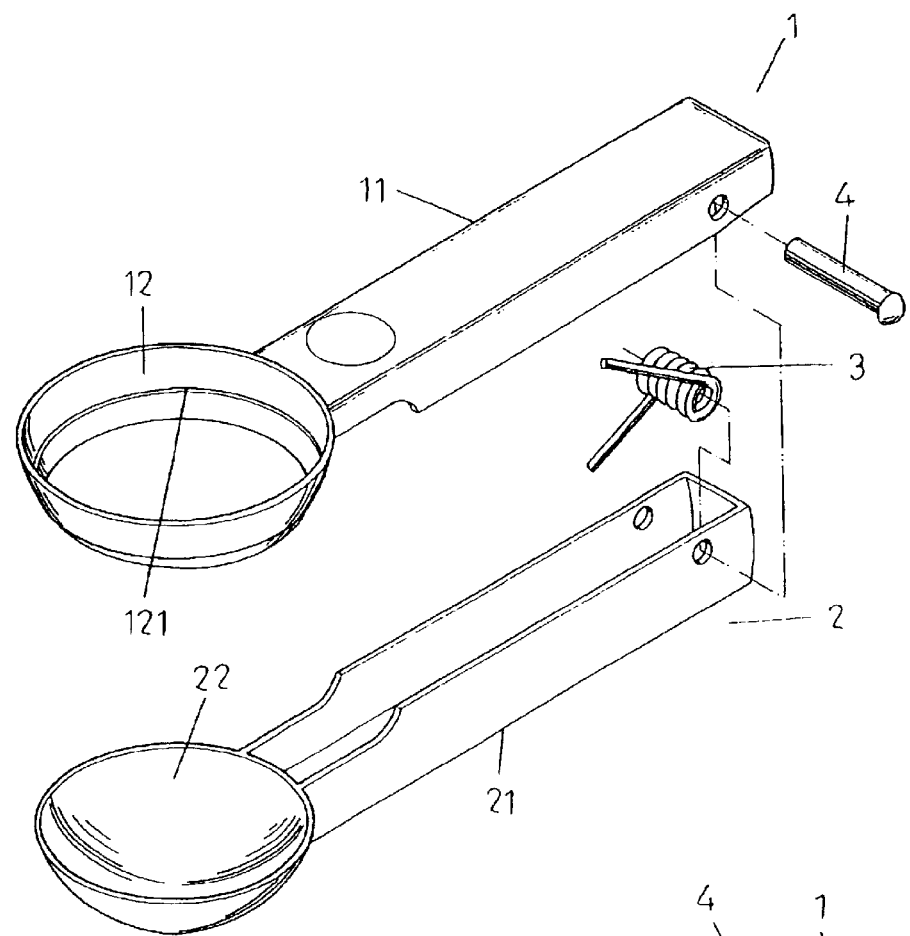
FIG. 1 is an exploded perspective view of an ice cream scoop in accordance with the present invention.
Figure 2:
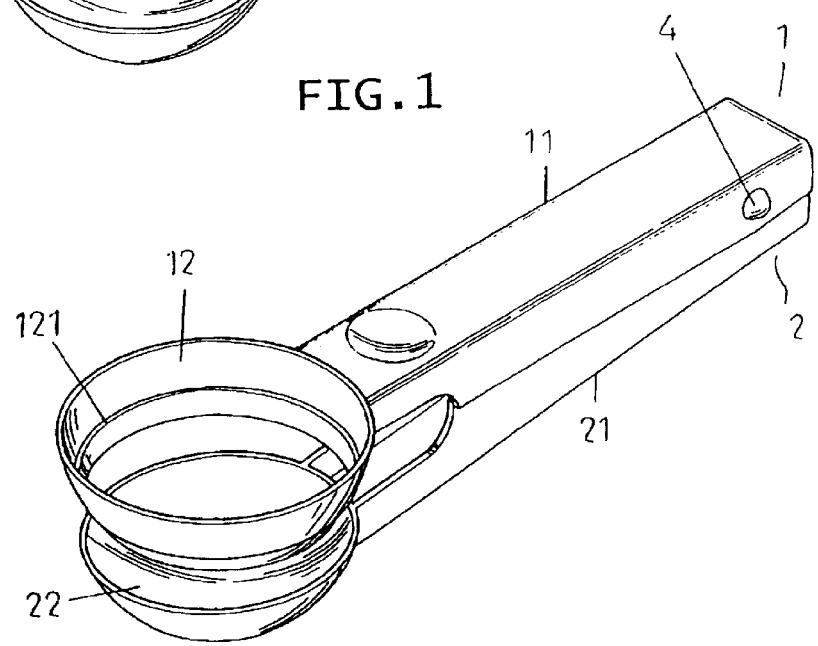
FIG. 2 is a perspective view of the ice cream scoop in accordance with the present invention.

Referring to FIGS. 1 and 2, an ice cream scoop in accordance with the present invention generally comprises a first scoop member 1 and a second scoop member 2. The first scoop member 1 includes a handle 11 and a ring 12 formed on an end of the handle 11. The ring 12 includes a stepped portion 121 in an inner periphery thereof. The second scoop member 2 includes a handle 21 and a bowl 22 formed on an end of the handle 21.

The other end of the handle 11 of the first scoop member 1 and the other end of the handle of the second scoop member 2 are pivotally connected by a pin 4. An elastic element 3 is attached between the other end of the handle 11 of the first scoop member 1 and the other end of the handle of the second scoop member 2 for biasing the ring 12 of the first scoop member 1 and the bowl 22 of the second scoop member 2 away from each other.

Figure 3:
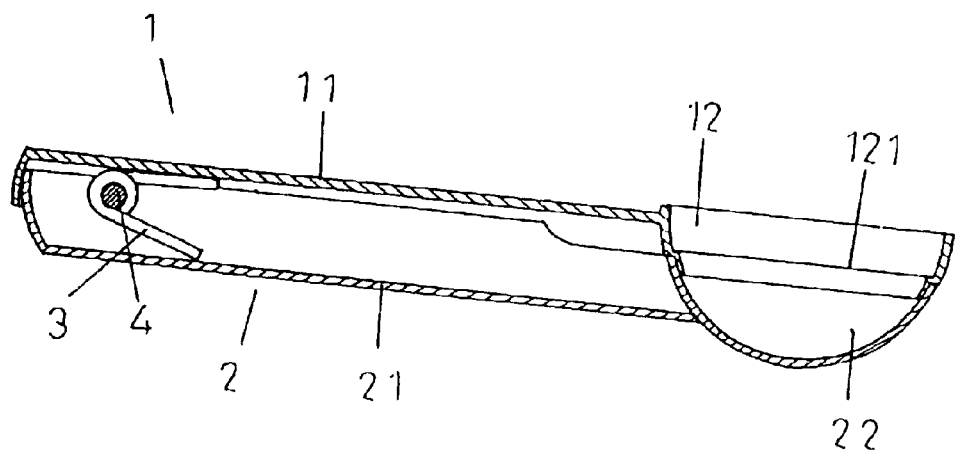
FIG. 3 is a sectional view of the ice cream scoop in accordance with the present invention in a state for scooping ice cream.
Figure 4:
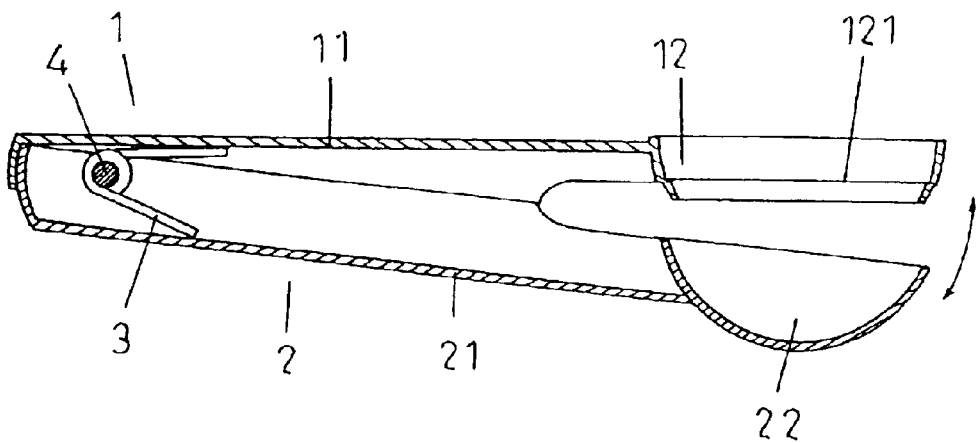
FIG. 4 is a sectional view similar to FIG. 3, wherein the ice cream scoop is in a state for rejecting ice cream.

FIG. 3 is a sectional view of the ice cream scoop in a state for scooping ice cream. FIG. 4 is a sectional view similar to FIG. 3, wherein the ice cream scoop is in a state for rejecting ice cream. As illustrated in FIG. 3, the ring 12 of the first scoop member 1 is at least partially received in the bowl 22 of the second scoop member 2 when in the scooping position, forming a scoop for scooping. In particular, the ring 12 of the first scoop member 1 rests on top of the bowl 22 of the second scoop member 2 when in a state for scooping, with an outer periphery the stepped portion 121 of the ring 12 being in contact with an outer periphery of the bowl 22.

Figure 5:
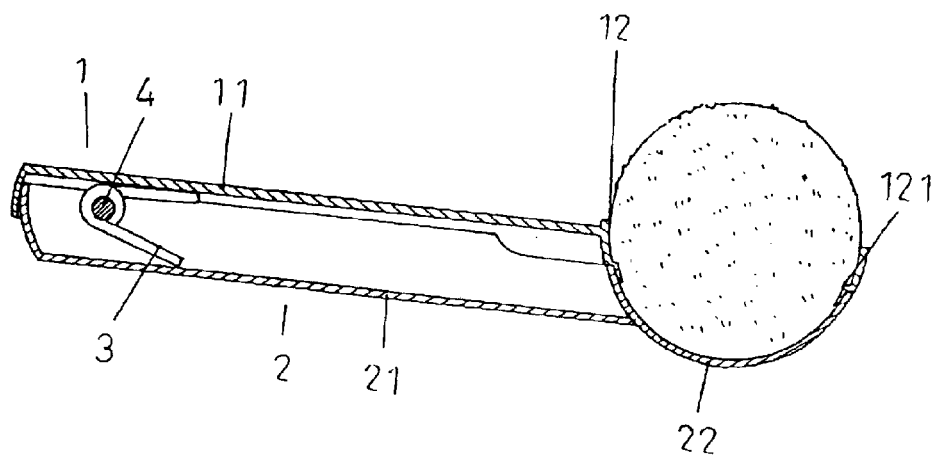
FIG. 5 is a section view similar to FIG. 3, illustrating scooping of ice cream.
Figure 6:
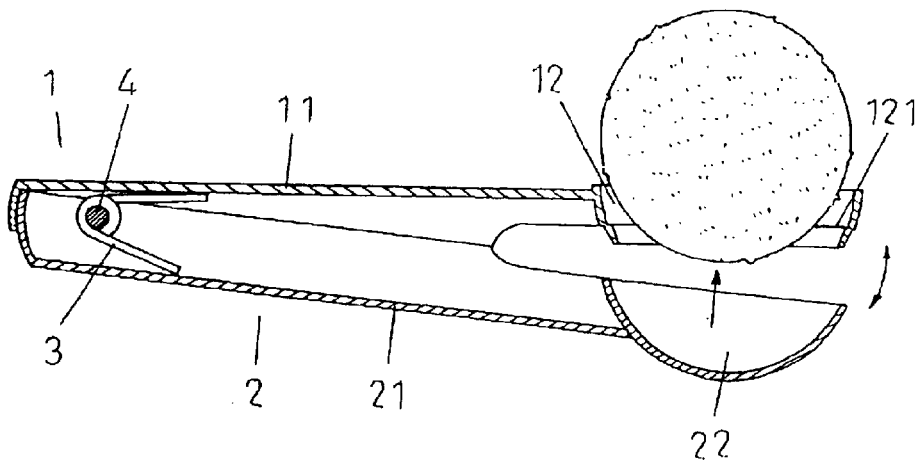
FIG. 6 is a sectional view similar to FIG. 4, illustrating rejection of ice cream.

Referring to FIG. 5, when scooping ice cream, the handles 11 and 21 are pressed toward each other by a hand of a user. When the pressing force is released, the elastic element 3 returns to its initial position, moving the ring 12 of the first scoop member 1 and the bowl 22 of the second scoop member 2 away from each other, as shown in FIG. 6. The ice cream can thus be easily rejected, as the ice cream is only in contact with a small portion of an inner periphery of the ring 12. More particularly, the ice cream leaves the bowl 22 and is thus less sticky to the ice cream scoop.

The stepped portion 121 of the ring 12 of the first scoop member 1 reinforces the ring 12 and thus allows scooping of hard ice cream without the risk of deformation of the ring 12.

Although the invention has been explained in relation to its preferred embodiment, it is to be understood that many other possible modifications and variations can be made without departing from the scope of the invention as hereinafter claimed.

What is claimed is:

1. An ice cream scoop comprising:

a first scoop member including a handle having a first end and a second end, a ring being formed on the first end of the handle of the first scoop member;

a second scoop member including a handle having a first end and a second end, a bowl being formed on the first end of the handle of the second scoop member;

the second end of the handle of the first scoop member and the second end of the handle of the second scoop member being pivotally connected;

the ring of the first scoop member being engageable with the bowl of the second scoop member to form a scoop for scooping ice cream;

an elastic element being attached between the second end of the handle of the first scoop member and the second end of the handle of the second scoop member for biasing the ring of the first scoop member and the bowl of the second scoop member away from each other for ejecting ice cream, wherein the ring includes a stepped portion in an inner periphery thereof, the ring of the first scoop member resting on top of the bowl of the second scoop member when the ice scream scoop is utilized for scooping, with an outer periphery of the stepped portion of the ring being in contact with an outer periphery of the bowl, said stepped portion forming a raised annular rim along an inner surface of said bowl and being positioned adjacent an upper edge of said bowl for separating scooped ice cream from said inner surface of said bowl.

2. The ice cream scoop as claimed in claim 1, wherein the ring of the first scoop member is at least partially removably received in the bowl of the second scoop member.

* * * * *